(No Model.)
J. C. F. SCHENCK.
COMBINATION TOOL FOR HORSEMEN.
No. 541,793. Patented June 25, 1895.
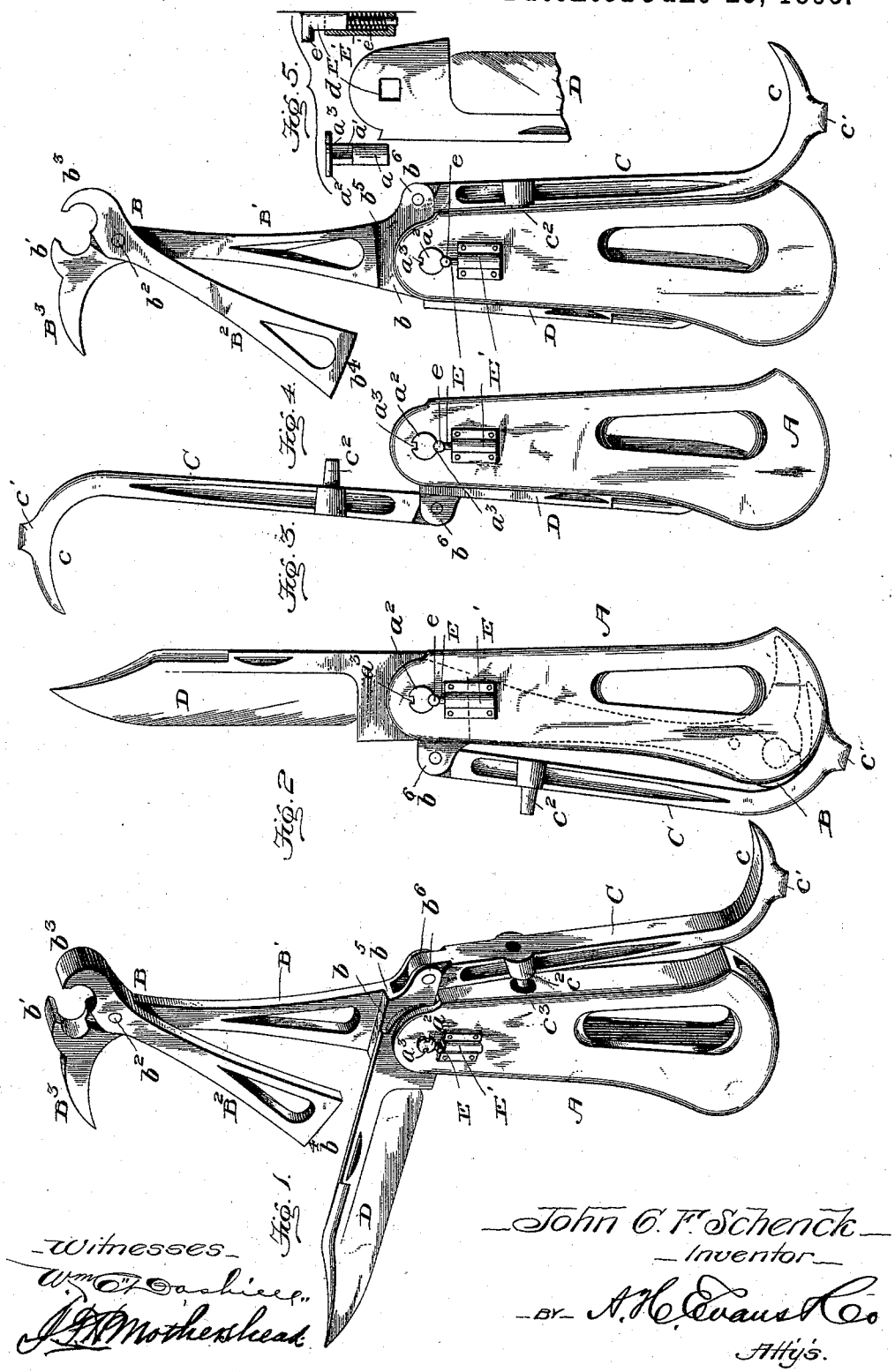
Witnesses
Wm. O. Dashiell
J. N. Mothershead
John C. F. Schenck
Inventor
By A. H. Evans & Co.
Att'ys.

UNITED STATES PATENT OFFICE.

JOHN C. F. SCHENCK, OF MOLINE, ILLINOIS, ASSIGNOR OF ONE-HALF TO CONRAD F. GRANTZ, OF SAME PLACE.

COMBINATION-TOOL FOR HORSEMEN.

SPECIFICATION forming part of Letters Patent No. 541,793, dated June 25, 1895.

Application filed March 27, 1895. Serial No. 543,422. (No model.)

*To all whom it may concern:*

Be it known that I, JOHN C. F. SCHENCK, a citizen of the United States, residing at Moline, Rock Island county, Illinois, have invented certain new and useful Improvements in Combination-Tools for Horsemen, of which the following is a full, clear, and exact description, reference being had to the accompanying drawings, in which—

Figure 1 is a perspective of the tool with its several parts open. Fig. 2 is a side elevation of the tool with its knife-blade fully open and other tools closed. Fig. 3 is a similar view with the combined hoof-cleaning hook, punch and screw-driver open. Fig. 4 shows the tool as arranged when the pinchers or nail-puller and its broad claw-hook are to be used, and showing the tool C in position to permit of its punch being operated, and Fig. 5 is a detail of the knife-blade and its pivot, and bolt.

The invention relates to combination tools, especially adapted for horsemen.

The object of the invention is to provide a simple and inexpensive tool which will be highly useful to horsemen, enabling them to clean and operate on a horse's hoof, repair harness, and which will also serve a variety of useful purposes.

The invention will first be described and then specifically pointed out in the claims.

A represents the handle of the tool which is in shape like a knife handle, and which is preferably formed in a single piece.

B is a combined pinchers or nail-puller and flat claw-hook; the member B′ of which is pivoted at its heel $b$ in the handle A by means of the pivot $a$. The member B′ is formed at its outer end with one jaw $b'$ of the pinchers and with the wide or flat edged claw-hook $B^3$, while the member $B^2$ is pivoted at its outer end by pivot $b^2$ to the member B′ and is there provided with the pinchers jaw $b^3$; the free end of the member $B^2$ being inclined slightly as at $b^4$, and fitting snugly against a corresponding shoulder $b^5$ on the heel $b$, so that when the member $B^2$ is closed, it will lie perfectly flush with the member B′.

The claw-hook $B^3$ may be sharpened so as to pare the hoof, especially around the frog, while the pinchers will serve to pull out nails that may get into the hoof and also serve other useful purposes.

The heel $b$ is provided with two ears $b^6$ at its back, which engage the corresponding end of the back of the handle and hold the tool B as a whole, from backward movement when in use.

C is the combined pointed claw-hook and punch, the shank of which is pivoted at its inner end between the ears $b^6$ and its hook proper $c$ passes around the outer end of the tool B when the parts are folded as shown in Fig. 2.

The outer hooked end of the tool C is provided with a screw-driver $c'$, while the back of its shank is provided with a punch $c^2$ adapted to register with an opening $c^3$ in the back of the handle A and thus holes may be punched in straps and parts of harness. The hook C being pointed, may be used to remove stones, dirt, &c., from between the shoe and hoof as will be readily understood. This tool or hook C also serves as a lever for swinging the tool B out of the handle and accomplishes this when swung from the position shown in Fig. 3 to that shown in Fig. 4.

D is a knife-blade of ordinary construction and mounted on the pivot $a$ so as to fold into the handle alongside of the tool B. This pivot $a$ has a squared portion $a'$ and a head $a^2$ provided with opposite notches $a^3$ in the periphery. The square aperture $d$ in the knife-blade fits upon the squared portion $a'$ and causes the pivot to turn with the blade in opening and closing it.

E is a spring-pressed bolt mounted in a casing E′ secured to or formed upon the knife-handle and is provided with a finger piece $e$ by which it may be operated. The spring $e'$ throws the nose of the bolt E into one or the other of the notches $a^3$ according to whether the blade D is open or shut and thus the blade is securely locked.

The many uses to which the implement may be applied are so apparent and the operation so readily understood, that further description is deemed unnecessary.

Having thus described the invention, what is claimed is—

1. The combination with the handle and its blade pivoted therein; the said pivot turning with the blade and provided at one end with a peripherally notched head, of a spring-pressed bolt mounted in a case or holder on the outer side of the handle and adapted to snap into either of said notches substantially as set forth.

2. A horseman's combination tool, comprising a handle, and a pair of pinchers folding therein and adapted to be swung out into longitudinal alignment with the handle; one member of the pinchers having its heel pivoted in one end of the handle and provided with a shoulder and the other member pivoted on the side of the first member with its inner end registering with said shoulder; the two members being flush when folded and having the jaws at their outer ends, substantially as set forth.

3. A horseman's combination tool, comprising the handle, the pinchers to fold therein and comprising two members of different lengths pivoted together side by side with the heel of the longer member pivoted in the handle and the outer end of the longer member formed with a claw-hook back of its jaw, substantially as set forth.

4. A horseman's combination tool, comprising a handle, pinchers pivoted to fold therein, and a combined punch and pointed claw-hook pivoted to the heel of the said pinchers with its punch operating in connection with the back of the handle and its hook extending around the outer end of the pinchers when the parts are folded, substantially as set forth.

5. A horseman's combination tool, comprising a handle having a hole in its back, a combined pinchers and wide claw-hook pivoted by one member in the handle to fold therein, and a combined claw-hook and punch, the shank of which is pivoted to the heel of the pivoted pinchers-member with its outer hooked member extending over the outer end of the pinchers and a punch on the back of the shank to register with said hole in the handle, substantially as set forth.

6. A horseman's combination tool comprising a handle, a pair of pinchers pivoted by one member thereto to fold therein, and a combined punch, pointed claw-hook and screw driver, the shank of which is pivoted to the heel of the pivoted pinchers member and the outer hooked end of which passes around the outer ends of the pinchers and is there provided with a screw driver, the punch being on the back of said shank near its pivoted end, substantially as set forth.

7. A horseman's combination tool comprising a handle, a knife blade pivoted thereto, mechanism for locking the blade open and closed, a combined pinchers and claw-hook pivoted on the knife-blade pivot to fold into the handle side by side with the blade, and a combined punch and claw hook, the shank of which is pivoted at one end to the heel of the pivoted pinchers member, its opposite hooked end extending over or around the outer end of the pinchers when the parts are folded; the punch being secured to the back of said shank and operating in connection with the back of the tool handle, substantially as set forth.

8. The combination with the handle having a tool folding therein, of a punching tool pivoted to the heel of the first named tool and folding over the front or open side of the handle when the parts are in their closed or folded positions, substantially as set forth.

JOHN C. F. SCHENCK.

Witnesses:
CONRAD F. GRANTZ,
ELMER E. MORGAN.